Oct. 21, 1941.  A. L. GENTER  2,259,688
SEWAGE TREATMENT PROCESS
Filed March 8, 1939   2 Sheets-Sheet 1
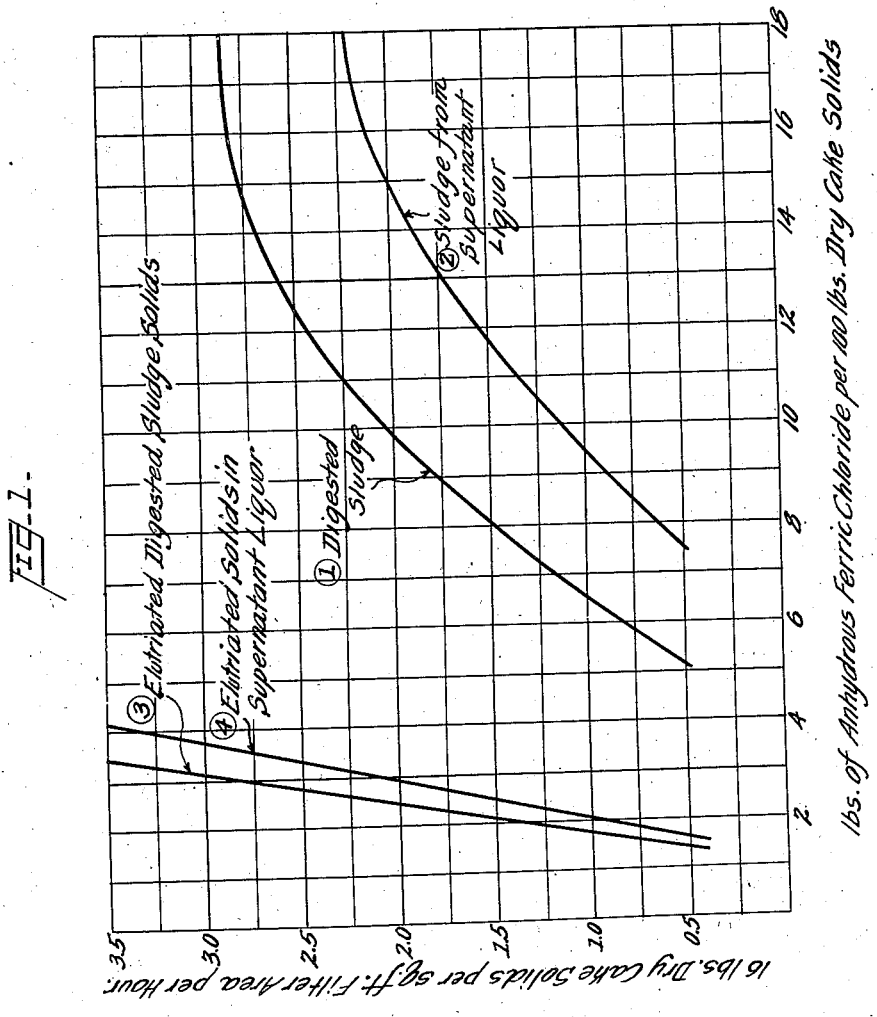
Inventor
Albert L. Genter,
By
Attorney

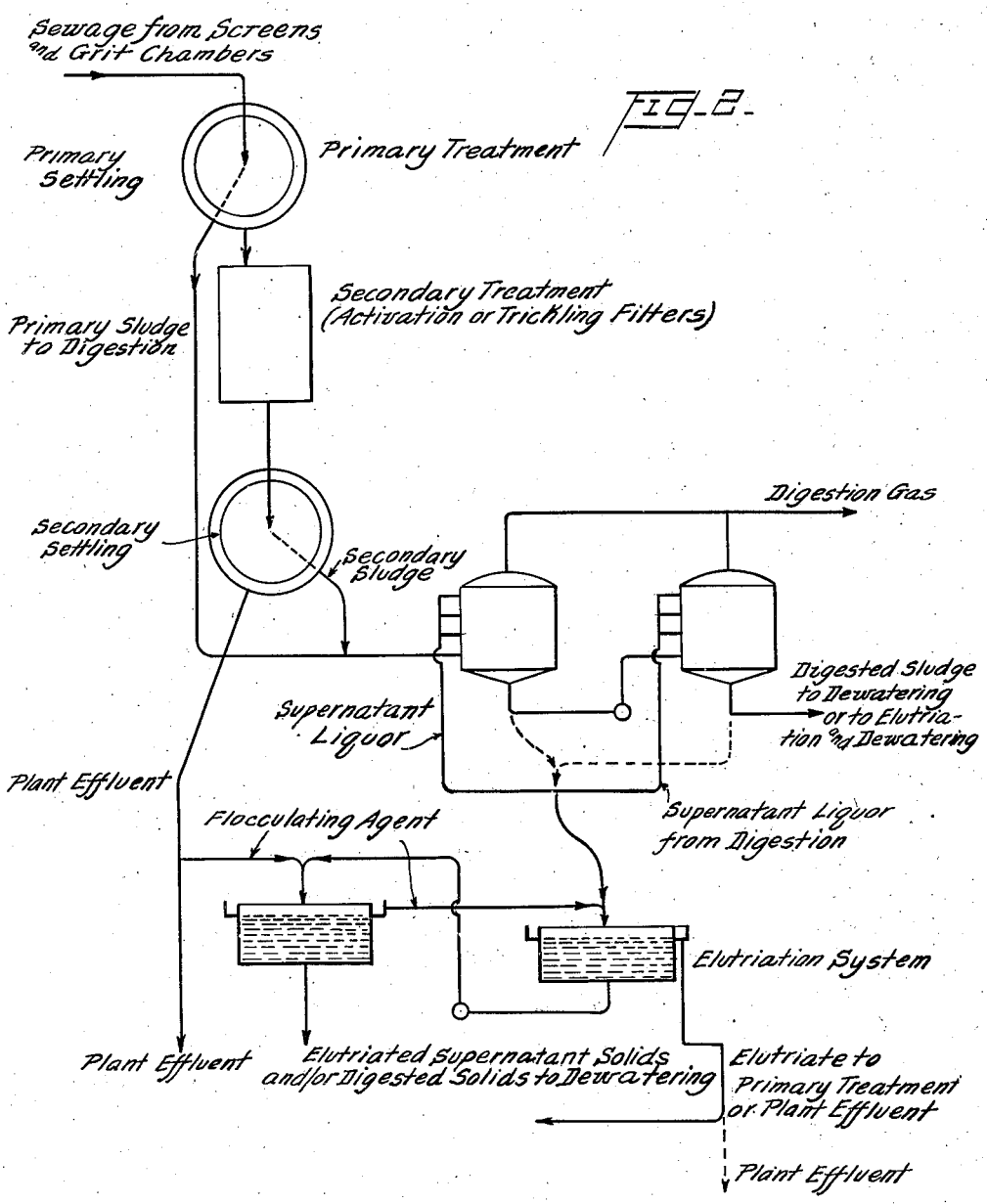

Patented Oct. 21, 1941

2,259,688

UNITED STATES PATENT OFFICE 2,259,688

SEWAGE TREATMENT PROCESS

Albert L. Genter, Baltimore, Md.

Application March 8, 1939, Serial No. 260,654

12 Claims. (Cl. 210—2)

My invention relates to sewage treatment and has particular application to, (a) the treatment of the more liquid portion or supernatant liquor obtained during the anaerobic digestion of the various sewage sludges accumulated during the sedimentation process in primary and secondary treatment of sewage, and (b) the accumulation and disposal of the finely dispersed solids suspended in this supernatant liquor.

Elutriation, as shown by my Patent No. 1,999,973, has been extensively used and has become standard practice in many large cities, such as Washington, Hartford, Baltimore, San Francisco, Greensboro, and Winnipeg, Manitoba. Notwithstanding this extensive use and the general knowledge of the art with respect to elutriation, no one has heretofore appreciated that the elutriation process may be used to solve the problem which has heretofore existed in respect to the disposal of the supernatant liquor from sludge digestion. The satisfactory treatment and disposal of this liquor has for years presented a difficult problem.

Until the present invention, it has been assumed that the problem of disposing of this liquor could not be satisfactorily rid of its difficulty, and the solution generally adopted was the return of the liquor to the primary treatment. The present invention is based on the discovery that contrary to this assumption that the liquor may be properly returned to the primary treatment, this supernatant digested liquor contains a substantial amount of suspended solids which decrease the efficiency of the primary sewage treatment process, and also upon the discovery that by elutriation of the suspended solids in this liquor, as well as the digested sludge, the efficiency of any treatment system may be substantially increased.

All modern sewage treatment plants involve equipment for the removal of a large percentage of the suspended settleable organic solids as far as economically possible from the large amount of polluted water. This removal is effected by sedimentation of the settling solids, preferably in mechanically operated sedimentation or settling tanks, called primary settling tanks, thus facilitating further chemical or biochemical treatment of the clearer effluent, called settled sewage, from these tanks. This effluent may receive no further treatment or may be subjected to further chemical or biochemical oxidation treatment which results in the flocculation or precipitation of further colloidal masses of organic solid liquid complexes. The collection of these flocculated masses in final settling tanks in order to rid the sewage stream of same is termed secondary settling or sedimentation and the settling tanks used for this purpose are termed secondary or final settling tanks. The sludge collected in the primary tanks is termed primary sludge and similarly the more dilute sludge collected in the secondary or final tanks is termed secondary or final sludge. The settled voluminous sludges drained or removed from the bottoms of such primary and secondary tanks are then treated and disposed of by various methods. Wherever secondary or final sludge is produced and collected, it is generally mixed with the primary sludge in the primary settling tank before further treatment and disposal of the collected mixture.

In order to better control the odor nuisance which can result from a rapid haphazard decomposition or putrefaction of such sludges, a large number of modern sewage treatment plants subject the sludges to further treatment in a specially cultivated bacterial environment which arrests the activities of odor producing organisms and decomposes the major portion of the organic matter in the sludges with remarkably little odor nuisance. This scientifically controlled decomposition process is known as sludge digestion, which destroys about half of the organic matter present, thus materially reducing the amount of sludge, and producing a stable non-offensive digested sludge of increased mineral content. Aside from this the digestion process produces relatively large quantities of sludge gas or digestion gas containing methane, carbon dioxide, nitrogen and some hydrogen, which is of considerable value as fuel and source of power.

In modern treatment practice the principal objects of digestion are: (1) the rapid production of a stable digested sludge, (2) regular production of such sludge, (3) satisfactory separation of digested solids from the surrounding sludge water or moisture, known as sludge liquor or sludge supernatant, (4) production and collection of the maximum amount of sludge gas, and (5) freedom from evolution of objectionable odors.

As the primary or mixed primary and secondary sludges going to sludge digestion may contain from 90 to 98 percent water and the organic solids in these sludges are decomposed, less solids result in digestion thus increasing the percentage of water present with the result that the digested or partially digested solids must again be settled to a new and more stable sludge (digested sludge) on the one hand and a supernatant liquid, called sludge liquor or supernatant liquor, on the other hand, as has been indicated in the preceding paragraph.

The degree to which sludge digestion is carried depends on several factors. If the sludge gas is required for heating and power production, or the sludge is to be dried on sand beds, prolonged digestion periods at constant temperature are advised in order to insure a maximum yield of gas and a maximum reduction in organic solids which produces a relatively odorless sludge of high solid content for sand bed dewatering. However, if the digested sludge is to be dewatered in mechanical equipment according to my U. S. Letters Patent, No. 1,999,973, and dried and incinerated, shorter periods of digestion can be used. Although the gas production may be somewhat diminished by this rapid digestion, the process of sludge elutriation insures a sludge and filter cake remarkably free of odors.

Modern digestion tanks are built as separate tanks operating in conjunction with the sludge sedimentation and collecting tanks. They are mostly circular in shape, generally constructed of concrete, equipped with rigid or floating covers, with and without stirring mechanisms, inlets for introduction of primary and secondary sludge, bottom outlets for withdrawing digested sludge and, at various tank levels, outlets for withdrawing sludge liquor or supernatant liquor. Gas collecting domes are also provided with modern covered digestion tanks so that the collected gas may be removed from the tanks by piping for use in heating and power generating equipment. Sampling cocks are also provided for observation and sampling of the introduced sludge, digested sludge and sludge liquor or supernatant liquor. Such modern tanks are maintained at a relatively uniform temperature, most conducive to rapid digestion, by heating equipment which utilizes a portion of the sludge gas for fuel and heat transfer through water which is properly circulated in heating coils arranged within the digestion tanks. As there is more sludge gas produced than required for tank heating purposes, some modern plants use the gas for power production in gas engines. In this case the cooling water from the gas engines, and even the heat from the engine exhaust gases, are used for heating the digestion tanks. The excess unused sludge gas is wasted to the atmosphere by burning in especially protected devices. All of this equipment also requires proper metering for sludges, gas and sometimes for supernatant liquor.

In separate digestion tanks of older design, no provision is made for gas collection and utilization and for maintaining optimal digestion temperatures, with the result that the digestion space required is materially larger than with modern equipment. Such older tanks are usually open to the atmosphere.

As the organic sludge particles decompose through anaerobic action in digestion tanks these particles evolve gas amounting to approximately 15 cubic feet per pound of volatile organic matter present in the sludge. The digesting particles therefore rapidly disintegrate and tend to float or remain in suspension in the surrounding water or liquor, due to the flotation effect of evolving and entrained or imbibed gas bubbles. As the gas evolution practically ceases, digestion similarly approaches completion. Then the particles lose most of the evolved gas and tend to sink to the bottom of the digestion tank together with the inorganic particles forming a thick sediment containing from 2 to 15 percent or even more of solids as solubles and insolubles in the balance of water. This sediment is always designated as digested sludge and, therefore, consists largely of water fouled by dissolved decomposition products, some dissolved mineral matter, insoluble mineral matter and flocculent masses of digested, but not completely decomposed, organic sludge.

The water or solution rich in dissolved decomposition products associated with the sludge solids is termed "sludge liquor." Therefore the sludge proper consists of the sludge solids and this liquor. The liquid contents of any digestion tank above the bed or blanket of bottom sludge, usually contains less total solids after evaporation than does the sludge proper and is usually termed either "supernatant", "supernatant liquor" or "sludge liquor." The sanitary engineer uses these terms interchangeably for the same thing. In the foregoing and following they are likewise so used.

During active digestion, the decomposing solids will repeatedly float and sink until gas evolution ceases, thus mixing the tank contents and causing the upper, somewhat lighter, liquor portion to become quite black and dirty with finely divided suspended sludge particles. Near the finish of the digestion period the tank contents become more quiescent thus permitting most of the digested solids to settle more readily, which leaves a somewhat clearer yellowish to black liquid portion always referred to as supernatant liquor. The gas evolution and flotation process leaves some of the solids enmeshed in a flotation froth, called scum, which collects at the upper liquid level of the tank contents. If this scum is broken down at frequent intervals, some of the floated solids are freed of gas and settle, thus again making the supernatant dirtier.

In order to insure a better separation of digested sludge particles from the supernatant liquor, multi-stage digestion has been introduced. This consists in the use of a system of two or more digestion tanks in succession, each connected with the other for the progressive and automatic transfer of sludge and gas during digestion. The primary digestion tank is used for keeping the sludge in a homogeneous condition during active digestion and the digesting contents are kept at a constant level. In some cases mechanically operated stirrers are provided in these primary digestion tanks to thoroughly mix the tank contents periodically and to thereby somewhat hasten the digestion process. In the succeeding tank or tanks the digesting mixture rests under more quiescent conditions thus allowing the digested solids to settle away from the sludge liquor to form supernatant liquor. From 85 to 90 percent of the digestion process takes place in the first stage or primary digestion tank.

It will be seen that even with modern digestion equipment considerable expensive tank space for sludge digestion and separation of sludge and supernatant must be provided, i. e. from 1 to 4 cubic feet of space per capita served. If but one cubic foot of space is provided, digestion will be pushed to a relatively high rate in which case the contents of the digestion tank or tanks will be kept in a turmoil with the result that the supernatant liquor will contain a high proportion of suspended solids, i. e. 10,000 to 20,000 parts per million by weight. Where more space is provided in order to permit a more thorough separation of suspended solids from the supernatant liquor, to filtration increases with the thickness of the cake. Hence, to get three times as much filtrate through the same ultimate cake thickness in one instance than in another, at the same pressure, can take three times or more longer, or if the draining is done on a greater area, three times as much area producing one third the cake thickness will be required. In cases where digested sludges are partially dewatered in mechanically operated continuous suction filters, it has been suggested that the total mixture of sludge and supernatant be chemically precipitated with lime and ferric salts and the precipitate containing the sludge solids be drained in such filters. This is unfeasible from a standpoint of economy, because (a) the successful operation of such filters requires that the sludge cake be not less than about $\frac{1}{16}$ inch in thickness in order to provide sufficient matted cake material during each filter drum revolution to insure discharging the entire cake as a uniform sheet during the cake discharge period. Thin strips of cake, even though relatively dry, which fail to discharge and are left on the revolving drum rapidly smear and blind the filter medium, thus materially diminishing the available filter area, if not blinding the entire drum; (b) to gain the necessary filter yield in daily sludge solids considerably more filter area and auxiliary equipment are necessary, which means a proportionate increase in power, labor and maintenance per ton of sludge solids dewatered; and (c) as I have shown in my U. S. Letters Patent No. 1,999,973 and practice has demonstrated in all cases where the vacuum filtration of digested sludges is used, without subjecting the sludges to the elutriation treatment outlined in this patent, the amount of precipitating and coagulating chemicals necessary to render sludge solids granular enough to permit ready draining in such filters is roughly a function of the soluble decomposition products present in the sludge liquor, or moisture, and consequently in the sludge supernatant. This likewise means that the amount of precipitating chemicals used is roughly a function of the total amount of moisture present as sludge liquor or supernatant in any digested sludge. The more of this moisture or supernatant liquor there is associated with the sludge solids, the greater will be the amount of lime and ferric chloride used to precipitate the dissolved decomposition products and to render the sludge solids drainable in any continuous vacuum filter. Consequently, the greater will be the chemical operating costs per ton of sludge solids in the cake yield of the filter.

For example: No. 1—a dilute digested sludge containing but 1.5 percent solids (98.5 percent supernatant as moisture) required 9.7 percent ferric chloride and 33.7 percent lime, costing about $7.25, per ton of sludge cake solids yielded by the filter, to produce but one pound of sludge solids per square foot of filter area per hour as filter yield. This one pound yield corresponded to about 63 pounds of filtrate. Also, No. 2—when the sludge moisture in this same sludge was first diminished by proper sedimentation, so that 5.5 percent solids and 94.5 percent sludge liquor moisture remained, a filter yield of 3.5 pounds per square foot of filter area per hour and about 20 pounds of filtrate resulted from using 3.5 percent ferric chloride and 14 percent lime, costing about $2.80 per ton of cake solids yielded by the filter. This means that in removing about 70 percent of the sludge liquor moisture present per pound of sludge solids in No. 1 to produce No. 2, the chemical savings per ton of sludge solids treated were reduced by about $4.45 from $7.25 or about 61 percent, showing that the amount and cost of precipitating chemicals used is roughly a function of the amount of sludge liquor present in the sludge as moisture.

3.—When more of the original sludge liquor present as moisture was removed, i. e. about 63 percent of the moisture remaining in No. 2 or about 89 percent of that present in No. 1 by displacing most of this sludge liquor with purer water through simple single stage elutriation according to my Patent No. 1,999,973, the following remarkable reduction in chemicals took place. Using three volumes of purer water for elutriation purposes and allowing the washed sludge to settle in a single tank, a sludge having 6 percent solids and 94 percent purer liquid moisture resulted. Adding to this washed sludge but 3 percent ferric chloride on sludge solids and no lime resulted in a filter yield of 4.5 pounds of dry sludge solids per square foot of filter area per hour at a cost of $1.20 per ton of sludge solids for the ferric chloride. This was $6.45 or 84 percent less than the $7.25 chemical cost under No. 1 and $1.60 less or 57 percent less than the $2.80 cost per ton of sludge solids under No. 2.

It is, therefore, evident that dewatering the total mixture of digested supernatant and digested sludge on vacuum filters materially increases the amount of detrimental sludge liquor present and materially increases the filtration costs while producing much lower filter yields. In order to precipitate all of the soluble decomposition products present in the sludge liquor and supernatant and at the same time render the sludge solids coarsely coagulated so as to permit free and relatively rapid filtration, relatively enormous quantities of lime and ferric salts have to be added to the mixture, in which case the filter cake is largely composed of chemical precipitates rather than of sludge solids. If this large addition of chemicals is not resorted to, the filter cake will be so thin that it will not discharge from the filter cloth when sufficiently drained, with the consequence already indicated, i. e. the cloths become blinded. This blinding even took place in the foregoing Example #1 where copious amounts of chemicals were used.

It is now a well known and widely published fact that sludges elutriated according to my Patent 1,999,973 show materially greater filter yields without the use of any lime and at very low additions of ferric or aluminum salts than can be obtained when the detrimental sludge liquor moisture is not displaced by purer water. In using this process for digested sludges I have also discovered the following facts relating to the displacement of the supernatant liquor from the suspended solids contained in same by purer water through the process of elutriation. These discoveries relate (a) to the elutriation of the supernatant solids and (b) the solids in mixtures of supernatant liquor and digested sludge:

(a) I have discovered that treating the supernatant liquor containing suspended solids by elutriation, i. e. diluting and mixing it with water relatively free of dissolved decomposition products, permitting the solids to settle to a sludge and decanting the diluted supernatant in an elutriation settling tank not used for primary or secondary sludge settling, accomplishes a more rapid separation of the suspended solids from the dilute liquor than takes place if the suspended the suspended solids remaining in the liquor will amount to an average of about 2000 parts per million.

As previously indicated, the fresh sludges introduced to digestion tanks are largely composed of water, i. e. 98 to 90 percent, the proportion of water to solids really increases during the digestion process, because the organic solids decompose largely to gas, some of which concentrates to saturation in the sludge liquor and most of which escapes from the mixture. This decomposition also produces ammoniacal and other compounds which combine with some of the evolved carbon dioxide to form soluble ammoniacal carbonates, bicarbonates, carbamates, etc., which accumulate in and foul the sludge liquor as soluble decomposition products. Due to this increase in the proportion of water to decomposed and mineralized insolubles during digestion the remaining insoluble solids are again concentrated to produce the digested sludge in the digestion tanks provided.

The sludge liquor or supernatant liquor produced by this procedure amounts to from 2 to slightly over 3 gallons per pound of suspended solids introduced to the digestion tank from primary and secondary sewage settling tanks. Thus in a small plant treating one million gallons of sewage daily from ten thousand inhabitants, the solids introduced to digestion from primary sedimentation alone may amount to about 1000 pounds (½ ton) daily and the digested sludge supernatant may be from 2000 to 3000 gallons (8½ to 12½ tons) daily. If the plant has complete treatment, i. e. purification by activation, the solids introduced to digestion may amount to 1600 pounds daily in which case the supernatant liquor can amount to 4800 gallons (20 tons) daily. If this supernatant is relatively clean, it can contain about 100 pounds or more daily of suspended digested sludge particles for every ten thousand population served. In some cases, the figure is four or five times this amount.

Therefore, the third objective of sludge digestion, listed in the foregoing, i. e. the satisfactory separation of digested solids from supernatant liquor, is exceedingly difficult to obtain in modern digestion practice, especially where rapid digestion is resorted to, and several suggestions have been made and tried in the effort to definitely solve this problem.

Usually the supernatant liquor is returned to the sewage treatment process by way of the primary settling tanks. Where the digested sludge is dewatered and partially dried on sand beds, the supernatant liquor, if particularly dirty, is sometimes run onto the sand beds also. Attempts have also been made to run this liquor into special settling tanks to permit more of the suspended solids to settle. However, if this settling does not occur in the large digestion tanks, especially final stage digestion tanks of multistage digestion, there is little or nothing to be gained by such expensive settling treatment. As previously indicated, the suspended solids are usually floated or held in suspension because (a) they contain adsorbed or imbibed decomposition gas, and (b) the surrounding sludge liquor is saturated with the same gases and partially saturated with other soluble decomposition products thus resisting the escaping tendency of the gases held by the remaining suspended sludge particles. As a consequence of these facts, most of the suspended solids present in the supernatant liquor settle very slowly, while some tend to float to the upper surface and accumulate in a dark scum.

Furthermore in some cases the liquor collecting above the completely settled digested sludge may be composed of two or more roughly superimposed banks or pockets of clearer liquor alternating with floating banks of black sludge which has not lost enough gas to sink through the lower pockets of clearer liquor. In withdrawing supernatant at various tank levels, these floating sludge banks can also be withdrawn, thus producing decidedly dirty effluent.

The main reasons for returning as clear a supernatant liquor as possible to the primary settling tanks is to prevent unnecessary and troublesome accumulation of decomposed or partially decomposed organic solids in these settling tanks designed to settle out the fresher solids being carried by the sewage stream entering the plant. The return of partially digested solids in dirty supernatant liquor to this primary settling system not only increases the amount of sludge accumulated in the primary settling tanks, but also tends to make this sludge lighter, thus taking up settling space. Furthermore, it tends to introduce more anaerobic decomposition organisms, thus increasing decomposition with gas evolution in the primary tanks. This can have the effect of making the primary sludge lighter and more voluminous, thus decreasing the effective settling space and producing a thinner sludge going to digestion, which in turn overloads this valuable space with unnecessary water. The combined effect is then to produce a circulating load of partially digested solids returning in still dirtier supernatant from digestion back to primary settling and again back to digestion with the fresh primary sludge. In addition to this, any undue accumulation of supernatant solids in the primary settling tanks tends to produce a dirtier overflow from these tanks, whereby the biochemical oxygen demand of the primary tank overflow may be increased, thus lessening the efficiency of these tanks.

As the percolating and sludge drying capacity of any sand filter bed depends, among other things, on the proportion of the sludge retained by the bed to clear liquor which drains through the sludge and sand in any given time, conveying the entire mixture of digested sludge and supernatant onto sand filters can and does require considerably more sand filter area than if the sludge alone is drained by this method. For example, if the digested sludge and its supernatant liquor associated with one ton of digested sludge solids were run onto a sand bed to produce a final sludge cake containing 60 percent moisture, the amount of water to be drained and evaporated by the sun could be 29 tons. Whereas, if 20 tons of supernatant were first removed and the sludge containing the remaining 1800 pounds of digested solids were put on sand filters to produce a sludge cake of 60 percent moisture, there would be but about 9.2 tons of water to be drained, which is but a third of the amount drained from the entire mixture of supernatant and sludge. Draining 29 tons of water could require three times or more of the sand bed area than draining 9.2 tons for the simple reasons that filtration rates decrease not only with decrease in the size of the particles forming the cake (the sludge particles in the supernatant are materially finer than those in the sludge) but, what is of equal importance, the resistance of any accumulating sludge cake solids are permitted to gradually settle in the supernatant itself, thus easily effecting the satisfactory separation of suspended digested or partially digested sludge solids from the supernatant liquor called for as one of the principal objects of modern digestion. This means a further and better cleansing of the supernatant liquor from the suspended solids than has heretofore been accomplished, thus permitting the return of less suspended solids from the digestion tanks to the primary settling tanks in the sewage treatment process. The settled elutriated solids then may be collected in a small amount of sludge and conducted from the separate elutriation treatment system by way of the sludge dewatering equipment without circulating back to primary sedimentation and again to sludge digestion and so on.

As I have shown, most of the finely divided solids held in suspension in the normal supernatant liquor from digestion, remain suspended because they contain imbibed gases which cannot escape into the liquor already saturated with these gases and partially saturated or enriched with dissolved ammonical bicarbonates and similar decomposition products. Also some of the suspended particles are so colloidally dispersed that they would settle at a very slow rate in any liquid medium. However, by diluting the supernatant liquor and dirtier sludge liquor with water which is relatively free of dissolved gases and dissolved decomposition products as the first step in my elutriation process, most of the suspended solids yield their attached gases to the purer water, thus becoming heavier so that they settle far more rapidly than if left in their natural supernatant liquor. The remaining colloidally dispersed particles may be precipitated and swept down by adsorption during elutriation if necessary, as will be hereinafter shown. Added to this removal of imbibed gases from the suspended sludge particles by solution in a purer liquid medium is the fact that diluting the supernatant liquor with purer water diminishes the concentration of soluble decomposition products in the supernatant liquor, thus making it somewhat lighter which again facilitates the settlement of most of the suspended solids.

Experiments made on supernatant liquor from a digestion tank used for digesting primary and waste activated sludges show that by diluting this liquor in three volumes of relatively pure water (purified treatment plant effluent) most of the suspended solids settle from forty to fifty times faster in the dilute mixture than in the supernatant itself and produce a sludge containing a higher percentage of solids, because the settled washed solids contain less imbibed gases on the one hand and settle in a liquid mixture of lighter gravity on the other hand. Thus, the elutriation of the suspended solids in sludge liquor or supernatant liquor can be of definite economic advantage in effecting a better separation of the clear liquor from the suspended solids and can thereby become a material aid in accomplishing one of the principal objects of the sludge digestion process.

(b) As a result of the facts disclosed in foregoing discovery (a), the total mixture of digested sludge solids and sludge liquor which becomes supernatant does not have to be separated by sedimentation in second and subsequent stage digestion tanks to form sludge and supernatant thus leaving unnecessary amounts of digested and partially digested solids in suspension in the resulting supernatant. This necessary and important separation can be accomplished in the materially smaller and less expensive tank or tanks installed and employed for sludge elutriation. In this case, if the heavier sludge normally depositing in the first stage digestion tank can be run onto sand beds for drying, the very dirty supernatant can be elutriated and the suspended solids collected as elutriated sludge can then be mixed with the heavier sludge from the digestion tank or tanks and dewatered together on the sand beds, while the relatively clear overflow from the elutriation process is returned to the sewage treatment process.

If all digested and partially digested solids and associated moisture in the sludge containing the former are to be partially separated from the sludge moisture in mechanically operated filters, both the digested sludge normally depositing in the first stage digestion tank and the dirty supernatant can pass through the elutriation process, wherein the heavy washed sludge proceeds to coagulation and filtration while the clearer supernatant overflow (elutriate) from the elutriation tanks is returned to the treatment process.

In elutriating the supernatant liquor alone, a mixing device for thoroughly mixing the supernatant and elutriating water followed by a single settling or thickening tank is sometimes sufficient. This elutriating settling tank will be considerably smaller than the primary or secondary stage digestion tanks employed in modern plants because of the greater settling rates of the suspended solids in the mixtures of purer water and supernatant liquor. For example, if the second or any subsequent stage digestion tank is designed to have but the low capacity of one cubic foot of space per capita for the digestion of primary sludge and two cubic feet per capita for the digestion of mixed primary and secondary sludges (where activation is used) in the former case the elutriation tank will have but 0.04 cubic feet per capita space if use but 8 hours daily and 5 days weekly and about one third of this space if used continuously, while in the latter case the elutriation tank space will be but 0.07 cubic foot per capita if used for 8 hours daily and 5 day weekly service and about one third of this space if used continuously. In other words, the elutriation of the supernatant liquor reduces the space necessary for separating the supernatant liquor from the suspended sludge solids approximately 95 percent from the one or two cubic foot per capita space used mainly for concentration of supernatant solids in second or subsequent stage digestion tanks.

In elutriating the total mixture of sludge and supernatant from first or second stage digestion with the view of thoroughly washing all of the solids and dewatering same in mechanical filtering equipment while returning a clearer supernatant elutriate to the sewage treatment process, slightly more elutriation tank space will be required than for elutriating the digested sludge alone or for elutriating the supernatant liquor alone, as there will be more elutriating water used to displace more total sludge liquor from the total mixture of digested sludge and its supernatant. One elutriation tank with rewashing of the elutriated sludge can be used for smaller installations and two elutriations tanks will be better for larger installations in order to permit thorough washing of the total mixture by countercurrent or two stage elutriation procedure. In any case, the total elutriation tank space for elutriating the entire digestion tank mixture will vary from but 0.1 to 0.2 cubic foot per capita for 8 hour daily and 5 day weekly elutriation and dewatering service and about one third of this space for continuous service, according to whether only primary or a mixture of primary and secondary sludges are digested. This again results in a very material saving in second or subsequent stage digestion tank space.

In any of these procedures the sludge and supernatant liquor of the total mixture of both can be drawn together from the digestion tank or tanks and elutriated, or the sludge and supernatant can be independently drawn at independent intervals and treated separately at independent intervals. Or again one may desire to elutriate but a portion of the supernatant that is dirtier than the balance. This portion may be elutriated with or without the digested sludge.

If two or more stage digestion tanks are already installed and in use and the elutriation system is subsequently installed, sludge may be drawn from the second or final stage digestion tank together with the dirty mixture of supernatant and partially digested sludge solids from the first or preceding stage digestion tank or tanks and elutriated. Or this sludge may be drawn together with clearer supernatant from the final stage digestion tank or tanks and elutriated. Any of these procedures will be of advantage in providing more digestion space at any desired time. Excessive expensive digestion space is frequently installed in order to provide for ample storage space in case of periodic disturbances in digestion and in case the peak loads of primary sludge become unexpectedly excessive. The foregoing provisions eliminate the necessity of providing so much excessive digestion space.

Furthermore, where two or more digestion tanks are installed and used in series or stages and funds are not available for the installation of elutriation settling space, one of the digestion tanks can be used for this purpose. As the space occupied by any single digestion tank is far in excess of that necessary for elutriation settling, either copious amounts of water can be used or elutriated sludge solids can be accumulated and stored over several days time as elutriated sludge which can be re-elutriated by recirculation with elutriating water back into the same tank. In such an arrangement the supernatant and/or mixtures of same with sludge from the preceding digestion tank or tanks must be withdrawn from the preceding tank system, thoroughly mixed with elutriating water and introduced to the digestion tank being used for elutriation settling. In this case a constant overflow level and constant overflow of supernatant elutriate during elutriation can be provided. Furthermore, as such a tank provides copious storage space for the settled elutriated sludge provision can be made for recirculating the stored washed sludge back through this tank with elutriating water to insure thorough washing in case such is desired. In using a final stage digestion tank for such elutriation purposes it ceases to function as a digestion tank and becomes an elutriation settling tank. Therefore, this tank should be isolated from the foregoing digestion stage or stages so that no air gains access to the gas collecting system and conduits of the foregoing stage or stages. Furthermore, the use of any final stage digestion tank for elutriation purposes eliminates the necessity of heating this tank so that its formerly used heating system should be disconnected in case heating coils or other hot water connections are present. If heat were applied by the direct or indirect application of hot water to such a tank or any tank being used for elutriation settling purposes, sludge digestion would again take place thus defeating the purpose of elutriation removal of decomposition products and settling of the elutriated sludge solids.

(c) The solids usually suspended in the digestor supernatant liquor are not only more finely dispersed than in the settled sludge, but are also less digested, meaning that the suspended solids and especially those collecting in the scum may contain more or less organic volatile matter than those in the sludge and continue evolving some gas. I have discovered that these suspended and scum solids are more difficult to treat with chemicals and drain free of moisture in continuous vacuum filters than are the settled more completely digested solids collected in the bottom digested sludge of digestion tanks. This is particularly true of the suspended solids in the thinner dirtier supernatant mixture of liquor and partially digested solids in the first stage of modern heated digestion tanks, where completer separation of clearer supernatant and digested sludge particles has not taken place. In order for such first stage digestion tank solids to become better adapted to economic treatment with lime and ferric salts for vacuum filtration such supernatant solids from the first digestion stage should proceed to the second stage and become thoroughly digested, i. e. cease evolving gases and other decomposition products. However, by elutriating such supernatant from the first stage containing partially digested solids tending to remain in suspension and in the scum, I find that sludges settled from these elutriated solids require but little ferric or aluminum coagulant and dewater easily in vacuum filters, producing a filter cake which is practically odorless.

Figure 1 graphically shows this discovery, and Figure 2 illustrates diagrammatically a sewage treatment system including digestion, and the application of the present invention thereto.

The curves or graphs Nos. 1 to 4 of Figure 1 result from plotting various ferric chloride additions (horizontally measured) against the resulting filter yields (vertically measured) in pounds of dry sludge solids in the yielded filter cake per square foot of filter surface per hour of filtration time. The horizontally plotted ferric chloride additions show the pounds of anhydrous ferric chloride used per 100 pounds of dry sludge solids present in the yielded filter cake, i. e. the percentage of ferric chloride used on dry cake solids.

The sludge of graph No. 1 was taken from the second stage of a digestion system operating on mixtures of primary settled raw and secondary settled activated sludge, and the sludge produced for graph No. 2 was taken from the dirty supernatant of the first stage digestion tank of the same digestion system. The digested sludge for graph No. 1 was taken from the bottom of the second stage and, therefore, represented digested sludge. The sludge for obtaining graph No. 2 was produced by taking the dirty supernatant or sludge liquor from the top of the first digestion stage and permitting the solids to settle for 24 hours to form a sludge containing about two percent solids and 98 percent liquor, i. e. having about the same solid content as that sludge of graph No. 1. Graph No. 1 then resulted from adding successively greater amounts of ferric chloride to successive batches of the digested sludge from the bottom of digestion tank No. 2 and subjecting these successive batches to filtration under vacuum and measuring the filter yields. Graph No. 2 resulted from using the same procedure on successive batches of the sludge produced from the upper or supernatant mixture from digestion tank No. 1. Comparison of the two resulting graphs Nos. 1 and 2 clearly shows that the dewatering of the sludge solids in the supernatant liquor was not only definitely slower than the dewatering of the solids in the digested sludge of graph No. 1, but considerably more chemical was required in the case of graph No. 2 to produce the same filtration rates recorded in graph No. 1. For example, to obtain one pound filter yield in both instances, about 6.5 percent ferric chloride (6.5 pounds per 100 pounds of dry cake solids) was necessary with the digested sludge of graph 1, and 9.5 percent ferric chloride for the sludge made from the supernatant liquor in graph 2, meaning that the latter sludge required 46 percent more ferric chloride than did the digested sludge to produce the same filter yield of one pound of cake solids per square foot of filter area per hour.

When portions of the sludges represented by graphs 1 and 2 were elutriated by the countercurrent method, using about 3 volumes of the purified treatment plant effluent as elutriating water to one volume of the digested sludge of graph No. 1, and the dirty supernatant that made the sludge for graph No. 2, graphs 3 and 4 resulted. Graph No. 3 resulted from the elutriation of the digested sludge of graph No. 1 and graph No. 4 resulted from the elutriation of the dirty supernatant that produced the sludge of graph No. 2. In the latter graphs, 3 and 4, the great difference in chemical demand exhibited by the sludges of graphs 1 and 2 has almost disappeared and both of the elutriated sludges become easily drainable in vacuum filters at remarkably low chemical coagulant additions. For example, to again obtain the one pound filter yield on the elutriated digested sludge of graph No. 3, about 1.8 percent ferric chloride is used, i. e. 72 per cent less than in graph 1 and for the elutriated solids of the supernatant sludge in graph 4, 2 percent ferric chloride was used, which is 79 percent less than the 9.5 percent in graph 2. Whereas the chemical addition to the sludge of graph 2 was 46 percent greater than for the sludge of graph 1 to obtain the equivalent minimum filter yield of one pound after elutriating the solids in the same sludges, this difference in ferric chloride additions is but ten percent of a much smaller addition, which latter difference is almost negligible from a cost standpoint, namely, the difference in cost between a 1.8 percent and 2 percent addition on the one hand and 6.5 percent and 9.5 percent addition on the other hand. The latter difference is 3 percent ferric chloride on cake solids and the former is but 0.2 percent ferric chloride on cake solids, making the difference between graphs 1 and 2 fifteen times greater than the difference between graphs 3 and 4.

In attempting to filter mixtures of the supernatant and digested sludge as they came from the first stage digestion tank, the chemical additions were so high and the filter yields so low, due to the mixture containing but about one percent solids, that economic filtration was out of the question. The resulting graph would not be practically depicted on Figure 1, because the filter cake yields, at all ferric chloride additions, were below the minimum allowable limit of one pound per square foot per hour. However, by elutriating such mixtures from the same digestion tank, most of the solids in the supernatant were washed free of gases and other soluble decompositions products and settled with the washed solids of the digested sludge to a new and denser sludge. The resulting filtration graph was practically identical with graph 3.

These tests also showed that with elutriation of the dirty supernatant from the first stage of digestion, most of the solids that normally float and form a dark scum over the dirty supernatant also lost their matted or trapped gas bubbles that produce the flotation and settled to the bottom of the elutriation settling tank, thus materially improving this bothersome trouble common to some digestion tanks.

(d) I have also found that, whereas the soluble decomposition products concentrated in the sludge moisture or liquor during sludge digestion, form gelatinous precipitates with ferric and aluminum salts added to render the sludge solids coarsely coagulated and drainable in modern mechanical filters and thus detrimentally influence economical filtration, these same decomposition products may be used in conjunction with small amounts of precipitating chemical agents to aid in the clarification of the diluted sludge supernatant during the hereinbefore detailed methods of elutriation. The soluble decomposition products that accumulate in the sludge liquor during normal sludge digestion and form precipitates with ferrous, ferric and aluminum salts are principally bicarbonates of ammonia, ammonium compounds of carbonates, carbonate carbamate, and fatty acid compounds and numerous allied decomposition products.

In the foregoing paragraph, there is a distinction made on the one hand between the clarification of a turbid liquid by flocculation in the process of sedimentation wherein the liquid being purified is relatively stationary and the chemically formed precipitate floccules move through same by settling, and, on the other hand, clarification by flocculation or coagulation in the process of filtration through a stationary medium, wherein the medium and accumulating bed of floccules is relatively stationary and the liquid being purified moves through the same. Whereas gelatinous floccules may readily settle by gravity to a relatively loose sludge through any amount of stationary water and leave a clear supernatant liquid, attempts to reverse the process, when using the same amount of the same flocculating agent, by passing the liquid through a relatively tightly compacting stationary cake of gelatinous floccules by gravity or augmented pressure, soon produces an impervious gelatinous, compacted scum of floccules thus rapidly preventing further percolation of clear liquid. This is particularly true in the clarification of sludge supernatant and mixtures of same with digested sludge. Clarification of supernatant and its mixtures with sludge by flocculation during elutriation-sedimentation, when using small quantities of floc forming chemicals is particularly easy. However, attempts to reverse the process by passing any appreciable quantity of liquid through the compacting stationary bed of floccules and sludge solids by filtration rapidly ends in cessation of filtration unless (a) exceedingly large quantities of floc forming chemicals are added, or (b) the excessive amounts of ammoniacal bicarbonates and such present in the sludge liquor and which form excessive gelatinous flocs with the added flocculating agents are first displaced from the sludge liquor by purer water. In other words, these ammoniacal compounds may be of aid in using clarification by flocculating and sedimentation and of detrimental influence when using clarification by flocculation and filtration in any mechanical filtration equipment having a finely porous cloth or other felted or rigid filter medium to intercept and hold back all gelatinous floccules through which the clear liquid or water is passed.

For example, commercial aluminum sulfate or crude alum is excellent for raw water flocculation and clarification purposes by sedimentation. However, it cannot be used economically to precipitate out all of the ammoniacal bicarbonates and such and to coagulate the gelatinous solids in digested sludges so that draining of the clear water through a flocculated and coagulated mass of cake produced in a vacuum filter results. However, alum can be successfully used for filtration of such sludges if the latter are first elutriated to remove the excessive amounts of carbonates and bicarbonates and such that form too much gelatinous aluminum hydroxide precipitate with the added alum. This gelatinous precipitate of aluminum hydroxide in excessive quantities rapidly blinds any filter medium, thus rendering the use of alum for this purpose of no practical value.

However, in the clarification of the elutriate supernatant by the reverse process of sedimentation, small quantities of alum solution added to the purer elutriating water show remarkable results. The precipitate of aluminum hydroxide formed by adding any aluminum salt to the dilute water and sludge supernatant and/or its mixtures with digested sludge containing ammoniacal bicarbonates and such, rapidly gathers into floccules which are gelatinous and possess positive gel or colloidal surface properties within the pH ranges common to digested sludge liquors in their normal and more diluted concentrations. The floccules having positively charged surface properties rapidly settle through the dilute mixture and adsorb the negatively charged, finely dispersed suspended sludge particles, thus causing their removal with the result that the elutriated or diluted mixture rapidly clarifies itself producing a very clear supernatant elutriate and a rapidly settling elutriated sludge in the tank or tanks used for elutriation sedimentation. The overflowing or decanted clear supernatant or elutriate can then either flow back to the sewage treatment process or, if pure enough, be conducted to the plant effluent as shown in Figure 2 without proceeding through the treatment processes. The alum solution can be added either to the elutriating water first or to the mixture of digestor supernatant and elutriating water or in any manner that will result in the formation of an alum floc previous to or during sedimentation separation of the floc and clear elutriate. The mixing of elutriating water, alum solution, and sludge supernatant can be followed by or accompanied by mechanical flocculation before elutriation sedimentation if desired.

Small additions of lime hydrate may also be used for the purpose of precipitating the carbonates and bicarbonates in the diluted supernatant. A rather granular precipitate of lime carbonate results which exercises some enclosing and sweeping down action of suspended sludge particles in the dilute mixture.

The lime hydrate added in this procedure forms, on the one hand, insoluble lime carbonate precipitate with the ammoniacal and other bicarbonates and carbon dioxide gas present in the sludge liquor, and, on the other hand, soluble ammonium hydroxide. This liberated hydroxide can also unnecessarily consume ferric and aluminum coagulants to form gelatinous hydroxide precipitates when the sludge is coagulated with such salt solutions. These gelatinous precipitates can retard filtration rates. Therefore in using this procedure with lime as oxide or hydroxide, it is better to proceed as follows: (1) add the lime to the supernatant liquor either alone or with the elutriating water, or followed by the addition of the elutriating water, (2) mix all three, (3) allow the sludge solids and carbonate precipitate to settle to a sludge, (4) decant the diluted elutriate containing most of the ammonium hydroxide and other dissolved impurities and (5) simultaneously or ad libitum withdraw and dewater the resulting sludge. In most instances further economy in coagulants for dewatering this sludge will be effected by again elutriating the sludge in relatively purer water to remove as far as possible the remaining ammonium hydroxide. This procedure can be effectively used with the counter-current elutriation method disclosed in my Patent No. 1,999,973.

However, calcium hypochlorite in small quantities is better than lime if precipitating action combined with purifying or sterilizing action is desred. The liberated calcium hydroxide likewise precipitates as a carbonate, etc. with the soluble ammoniacal decomposition products while the liberated hypochlorous acid destroys organisms and any unstable organic compounds or matter. The liberation of hypochlorous acid for reducing the biochemical oxygen demand of the supernatant elutriate in the elutriation system can be further facilitated with the incidental formation of a positive hydroxide floc by making a milk of calcium or other hypochlorite and adding to the same either a weak solution of aluminum or ferric or ferrous sulfate. This readily liberates hypochlorous acid and forms either aluminum hydroxide, ferric hydroxide or ferrous hydroxide. The last named rapidly oxidizes to ferric hydroxide and also acts as a positively charged capillary gel in sweeping down and precipitating suspended sludge particles in the diluted supernatant liquor or mixtures of same with digested sludge, while producing a clear elutriate supernatant of relatively low biochemical oxygen demand.

It is evident from the foregoing that the elutriation of the finely and coarsely suspended solids in supernatant liquors from open and closed separate digestion tanks and/or the elutriation of such solids in unsettled mixtures of digested sludge liquor and solids from the first or subsequent stages of multi-stage digestion tanks accomplishes three definite advantages and novel functions in the separation of digestion tank liquor from the digested or partially digested solids, together with other advantages, i. e., (1) provides a simple and more satisfactory separation of suspended digested and partially digested solids from a clearer more dilute sludge liquor, (2) lessens the necessity of large digestion tank space by eliminating the necessity of copious second and third stage digestion space in those cases where such space is principally employed for quiescent sedimentation of the digested sludge solids in the sludge liquor, and (3) the suspended solids removed from the normal supernatant sludge liquor by elutriation with purer water, with and without the use of active and floc forming chemicals, do not recirculate back to the fresh sludge collecting system and again back to sludge digestion. Instead, they are dewatered and disposed of with the digested sludge normally going to sludge dewatering.

Further advantages are, (a) elimination of the use of extensive sand bed areas for further clarifying the supernatant liquors, (b) dewatering of the elutriated supernatant solids and sludge solids, together with small coagulant additions in the same vacuum filter equipment without increasing the filter area, (c) more freedom from turbulent conditions in digestion tanks, (d) shorter digestion periods can be used, which also provides more digestion space, (e) the use of stirring mechanisms to hasten digestion can be freely used without necessitating copious sedimentation space for sludge and clearer supernatant liquor, separation in subsequent digestion tank space and (f) scum forming troubles in digestion tanks can be lessened if not eliminated. In fact, elutriation treatment of such mechanically stirred sludge mixtures or of hastily separated dirty supernatant obtained by rapid sedimentation treatment of such stirred mixtures makes possible a more widespread use of such stirring devices by diminishing and/or eliminating expensive second or subsequent stage digestion space.

Referring further to Figure 2, which illustrates diagrammatically a typical sewage treatment plant including a two-stage digestion system for the primary settled sludge and/or secondary sludge, it will be noted that the supernatant may be removed from either one or both digestion tanks and delivered to the elutriation system with or without digested sludge. By reason of the present invention, the digested sludge from either tank of the system may be mixed with the supernatant and the mixture delivered to the elutriation system. It will further be noted that the flocculating and/or purifying agent can be added to the elutriation system at any desired point before elutriation sedimentation. In smaller plants, a single elutriation tank may be used as hereinbefore described. In larger plants, the use of two tanks, as indicated in Figure 2, may be employed. The decanted or overflowing elutriate from the elutriation system is returned to primary sedimentation or, if flocculating and/or purifying agents are used in the elutriation system, the elutriate can be discarded with the treatment plant effluent. The elutriated solids from the supernatant liquor and/or mixtures of this liquor with digested sludge are conducted to the sludge dewatering system to be disposed of as by dewatering and/or incineration. It will thus be seen that these solids pass directly out of the primary and digestion treatment systems and go directly to sludge disposal.

I claim:

1. In a sewage treatment system having primary settling and sludge digestion, the process of eliminating from the primary settling and digestion systems solids suspended in the sludge digestion liquor which comprises withdrawing a supernatant liquor from the digestion system, elutriating the solids suspended in said liquor with water relatively purer than said liquor to remove gases and other decomposition products from said suspended solids so that they will settle and settling said solids from said mixture of water and liquor in a tank other than the primary settling system, and dewatering said solids.

2. In a sewage treatment system having primary settling and sludge digestion, the process of eliminating from the primary settling and digestion systems solids suspended in the sludge digestion liquor which comprises withdrawing a supernatant liquor from the digestion system, elutriating the solids suspended in said liquor with water relatively purer than said liquor to remove gases and other decomposition products from said suspended solids so that they will settle and settling said solids from said mixture of water and liquor in a tank other than the primary settling system, and dewatering said solids, and returning the elutriate to the treatment system.

3. In a sewage treatment system having primary settling and sludge digestion, the process of eliminating from the primary settling and digestion systems solids suspended in the sludge digestion liquor which comprises withdrawing a mixture of partially and more completely digested solids and their associated supernatant liquor from the digestion system, elutriating the solids suspended in said liquor with water relatively purer than said liquor to remove gases and other decomposition products from said suspended solids so that they will settle and settling said solids from said mixture of water and liquor in a tank other than the primary settling system, and dewatering said solids.

4. In a sewage treatment system having primary settling and sludge digestion, the process of eliminating from the primary settling and digestion systems solids suspended in the sludge digestion liquor which comprises withdrawing digestion liquor from one portion of the digestion system and digested sludge from another portion of the digestion system, mixing the withdrawn portions with water relatively purer than the sludge liquor to elutriate the solids associated with the digestion liquor in the withdrawn portions in order to remove gases and other decomposition products from said solids so that they will settle, and settling said solids from said mixture in a tank other than the primary settling system, and dewatering said solids.

5. In a sewage treatment system having primary settling and sludge digestion, the process of eliminating from the primary settling and digestion systems solids suspended in the sludge digestion liquor which comprises withdrawing supernatant liquor from the digestion system, forming in the diluted mixture aluminum hydroxide precipitate flocs with the soluble bicarbonates present in said sludge liquor by diluting and mixing said liquor with relatively pure elutriating water and a solution of an aluminum salt and settling the solids and flocs in a tank other than the primary settling system, to form a flocculated elutriated sludge and a clarified supernatant liquid, removing the supernatant liquid, and dewatering said sludge.

6. In a sewage treatment system having primary settling and sludge digestion, the process of eliminating from the primary settling and digestion systems solids suspended in the sludge digestion liquor which comprises withdrawing the supernatant liquor from the digestion system, diluting and mixing said liquor with relatively pure elutriating water and a solution of a salt capable of forming in the diluted mixture hydroxide precipitate flocs with the soluble bicarbonates present in said sludge liquor and forming such flocs and settling the flocs and solids in a tank other than the primary settling system, to form a flocculated elutriated sludge and a clarified supernatant liquid, removing the supernatant liquid, and dewatering said sludge.

7. In a sewage treatment system having primary settling and sludge digestion the process of eliminating from the primary settling and digestion systems solids suspended in the sludge digestion liquor which comprises withdrawing the supernatant digestion liquor from the digestion system, diluting and mixing said liquor with relatively pure water and a chemically active purifying agent capable of reducing the biochemical oxygen demand of the diluted mixture and settling the suspended solids in a tank other than the primary settling system, to an elutriated sludge, removing the supernatant liquid, and dewatering the sludge.

8. In a sewage treatment system having primary settling and sludge digestion the process of eliminating from the primary settling and digestion systems solids suspended in the sludge digestion liquor which comprises withdrawing the supernatant digestion liquor from the digestion system, diluting and mixing said liquor with relatively pure water and a chlorinating agent in amount capable of reducing the biochemical oxygen demand of the diluted mixture and settling the suspended solids in a tank other than the primary settling system, to an elutriated sludge, removing the supernatant liquid, and dewatering the sludge.

9. In a sewage treatment system having sludge digestion, the steps of withdrawing the supernatant digestion liquor, elutriating the solids suspended in said liquor, returning the supernatant liquor to primary settling, settling the solids and dewatering the sludge.

10. In a sewage treatment having sludge digestion, the process comprising elutriating the solids contained in the supernatant digestion liquor and, the digested solids, returning the supernatant elutriate to plant effluent, settling the solids and dewatering the sludge.

11. In a sewage treatment system having primary settling and sludge digestion the process of eliminating from the primary settling and digestion systems solids suspended in the sludge digestion liquor which comprises withdrawing the supernatant digestion liquor from the digestion system, diluting and mixing said liquor with relatively pure water and a chlorinating agent and a salt capable of forming in the diluted mixture gelatinous hydroxide precipitate flocs with the soluble bicarbonates present in said sludge liquor and settling the flocs and suspended solids in a tank other than the primary settling system, to a sludge, and dewatering the sludge.

12. In a sewage treatment system having primary settling and sludge digestion, the process of eliminating from the primary settling and digestion systems solids suspended in the sludge digestion liquor and ammoniacal bicarbonates dissolved in the same which comprises withdrawing the digestion liquor from the digestion system, adding calcium hydrate and water relatively purer than said digestion liquor to dilute said liquor, mixing said lime hydrate, liquor and water so that the soluble ammoniacal bicarbonates and dissolved carbon dioxide gas present in said sludge liquor will precipitate as lime carbonate and liberate ammonium hydroxide in the diluted mixture, settling said lime carbonate precipitate and said suspended solids in the diluted mixture in a tank other than the primary settling system, decanting the supernatant dilute solution to remove the soluble ammonium hydroxide and other impurities from said solids and dewatering the solids.

ALBERT L. GENTER.